Figure 1:
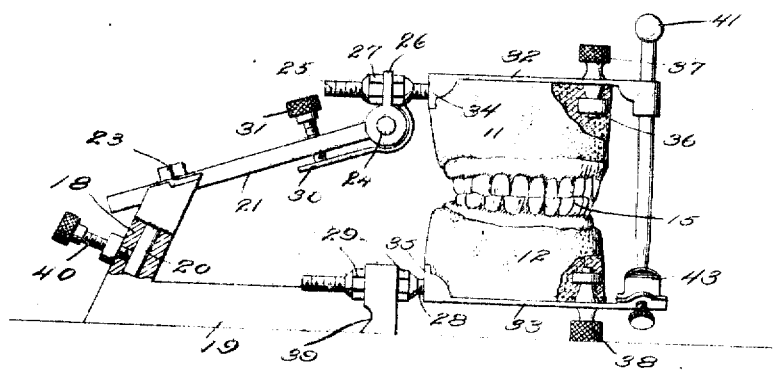

R. E. HALL.
DENTAL ARTICULATOR.
APPLICATION FILED JULY 2, 1914.

1,187,523.

Patented June 20, 1916.
3 SHEETS—SHEET 1.

Witnesses

Inventor
Rubert E. Hall.

Attorneys

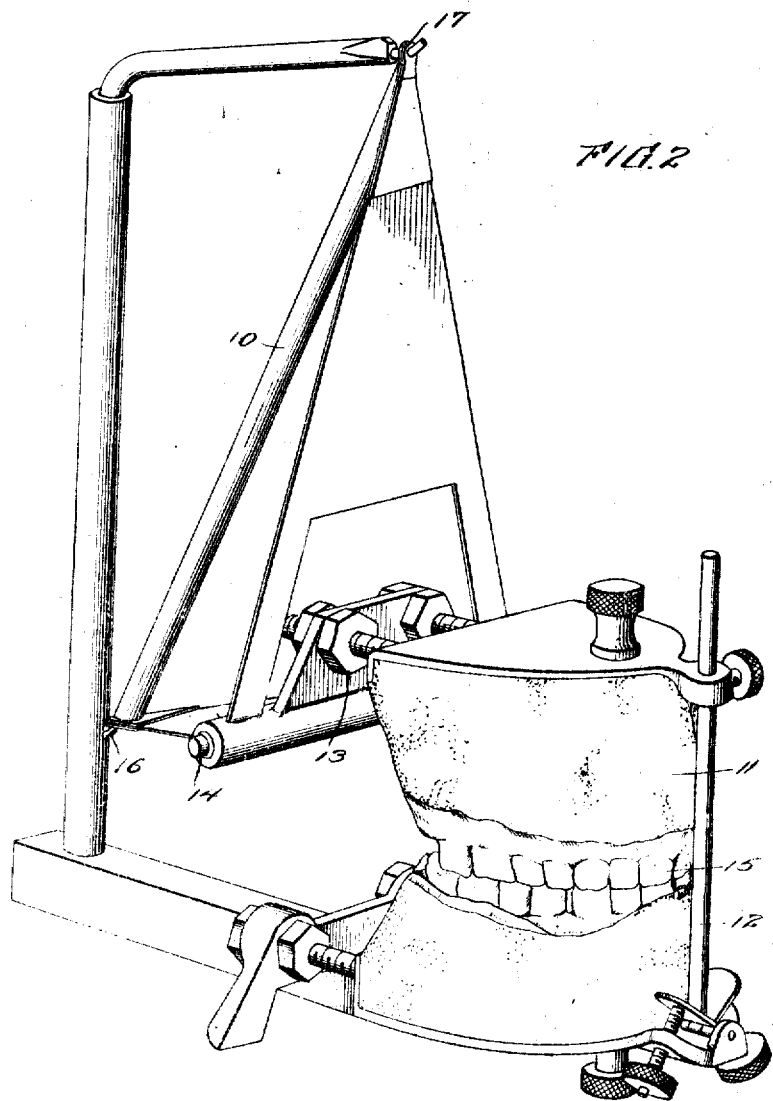

R. E. HALL.
DENTAL ARTICULATOR.
APPLICATION FILED JULY 2, 1914.
1,187,523.
Patented June 20, 1916.
3 SHEETS—SHEET 3.
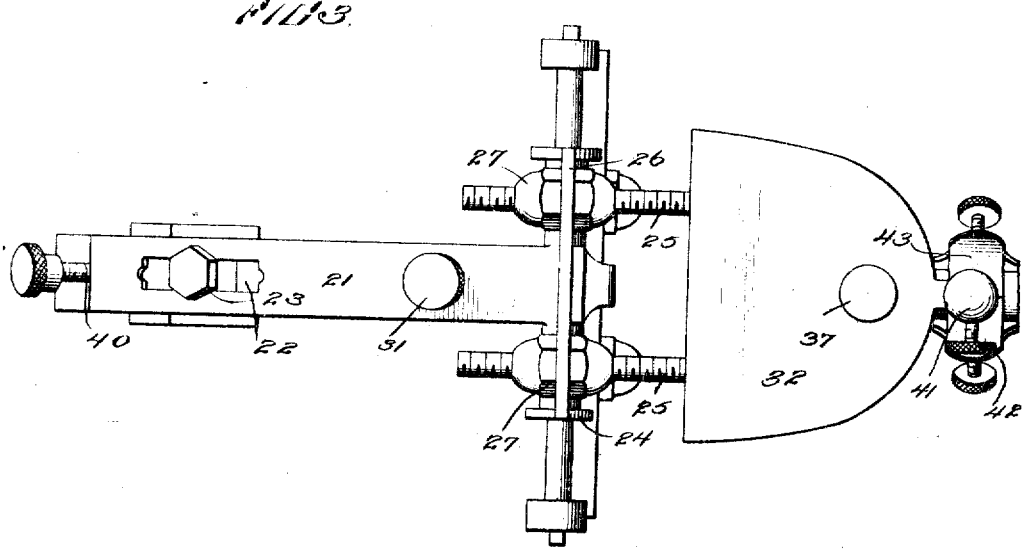
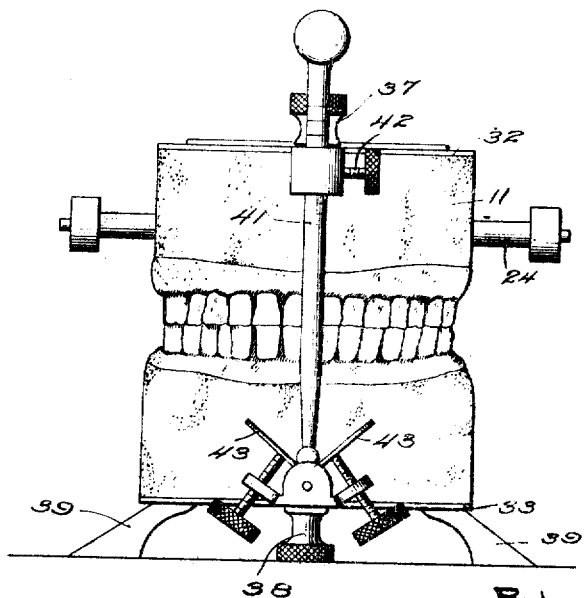

UNITED STATES PATENT OFFICE.

RUPERT E. HALL, OF HOUSTON, TEXAS.

DENTAL ARTICULATOR.

1,187,523.  Specification of Letters Patent.  Patented June 20, 1916.

Application filed July 2, 1914. Serial No. 848,659.

*To all whom it may concern:*

Be it known that I, RUPERT E. HALL, a citizen of the United States, residing at Houston, in the county of Harris and State of Texas, have invented certain new and useful Improvements in Dental Articulators; and I do hereby declare the following to be a full, clear and exact description of the invention, such as will enable others skilled in the art to which it appertains to make and use the same.

My invention relates particularly to that class of devices which are commonly known as dental articulators, and which are arranged to support for relative movement sets of artificial teeth in such relation as to simulate the movement of teeth carried by the human jaw.

The principal objects of my invention are, to provide mechanism which will produce with precision the actual relative movements of the human jaws, so that when artificial teeth have not been satisfactorily fitted thereon they may be placed in the mouth of the patient and worn without discomfort.

My invention comprehends mechanism which will produce such a relative movement of the upper and lower jaw models that the respective condyle points will be caused to traverse similar paths in opposite directions to a substantially equal extent.

Specifically stated, my invention comprises mechanism of the class described, in which the relatively movable upper jaw model carrier is mounted to oscillate upon an axis disposed in a plane oblique to the plane of occupation of the jaws, and affording a relative movement of said jaws in transversely disposed arcs.

My invention also includes all of the various novel features of construction and arrangement hereinafter more definitely specified.

In the accompanying drawings, Figure 1 is a side elevational view of an articulator showing a preferred embodiment of my invention; Fig. 2 is a perspective view of an articulator embodying a modification of my invention and showing diagrammatically the principles upon which the articulator shown in Fig. 1 is based; Fig. 3 is a plan view of the articulator shown in Fig. 1; and Fig. 4 is a front elevational view of the articulator shown in Figs. 1 and 3.

As best illustrative of the carrying out of my invention, reference is had to Fig. 2, wherein the rod 10 provides an oblique axis upon which the jaw model 11 is mounted to swing, the jaw model 12 being stationary. In addition to the swinging or arcuate movement of the movable jaw model, an opening and closing movement is accomplished by supporting the movable jaw model 11 on the plate 13 which is pivoted as at 14 upon a pivot corresponding to the condyle and fossæ of the human jaw. The jaw model 11 and its supporting plate 13 are hingedly carried by the frame which oscillates about the axis of the rod 10, which latter forms a part of said frame and which is pivotally supported at its ends 16 and 17 by an inverted L-shaped standard extending upwardly from the base of the device and turned longitudinally outward, as clearly shown in Fig. 2 of the drawings. The device as shown in Fig. 2, therefore, illustrates mechanically a device for furnishing such mandibular movements of the movable jaw as are to be desired. It has been found, however, that the pivot point 17, or in fact the pivot point 16, are wholly immaterial provided the resultant axis be preserved.

In the preferred form of my structure, I employ a rigid bearing block 18 carried by the base 19 with a pintle 20 rotatably mounted in said bearing block 18 and arranged at an angle corresponding to the angle of the axis of the bar 10 in Fig. 2. To this pintle 20 an arm 21 is adjustably secured, a slot 22 being provided in said arm and a bolt 23 employed to secure said arm in adjusted position, longitudinally, such adjustment being necessary by reason of the difference in length of the skull and jaw-bone of various persons. The arm 21 is provided with a hinge 24, and the distance between said hinge 24 and the center line of the pintle 20 should be equivalent to the distance between the hinge 24 and the center line of the teeth. The angle of the line from the hinge 24 to the center of the teeth should also be the same as the angle of the line from the hinge 24 to the center line of the pintle 20 as compared to the base. As the length of the arm between the hinge 24 and the center line of the pintle 20 is varied the equivalent line between the hinge 24 and the center of the teeth should be varied, such variation in the instrument being accomplished by mounting the teeth model upon a frame 25 which is adjustably secured to the plate 26 which forms one of the leaves of the hinge. The adjustment is accomplished and secured by means of lock nuts 27 or any usual well known mechanical means. The under jaw model 12 is, of course, necessarily brought into registration with the upper jaw model 11, a similar adjustment being provided by mounting the lower jaw model upon an adjustable frame 28 with jam nuts 29 for holding it in proper position relative to the base 19.

It will be apparent that by swinging the upper jaw model 11 relative to the lower jaw model 12 it will move upon the center line of the pintle 20 which has been pointed out is the same as the axis of the bar 10 in Fig. 2. The hinge 24 permits the jaw model 11 to be swung up out of engagement as desired and an arm 30 is provided rigid with the hinge leaf 26 and a screw 31 is also provided for adjusting the occlusion of the teeth as may be found necessary.

The teeth models 11 and 12 are respectively held in connection with their frames 25 and 28 by means of plates 32 and 33 respectively which are rigidly secured to said frames and have inturned flanges 34 and 35 and a nut 36 is embedded in the models engaged respectively by the screws 37 and 38. Feet 39 are also provided for holding the base against lateral movement and to prevent tipping of the structure. A screw 40 is provided which at times engages against the pintle 20 and retains said pintle against movement so that the only movement which can be accomplished is upon the hinge 24 returning to the exact lateral adjustment previously secured. The frame 25 also carries a pin 41 adjustable by means of a thumb screw 42 and engaging adjustable cams 43 carried by the base. This pin and cam arrangement is, however, disclosed in a prior co-pending application, Serial No. 815,020 filed January 28th, 1914, and is not claimed as a part of this invention.

It is believed that the operation of the device is clearly set forth in the description of the parts and the discussion of the action and that further description of such operation will not be necessary to a full and complete understanding of the invention.

I claim:

1. A dental articulator, comprising a lower jaw model holder, an upper jaw model holder pivoted to said lower jaw model holder on an axis oblique to the base of said lower jaw model holder, a hinged joint affording relative movement of said model holders toward and from each other, and means adjustable to vary the distance between the axis of the hinged joint and said oblique axle.

2. A dental articulator, comprising a lower jaw model holder, an upper jaw model holder pivoted to said lower jaw model holder on an axis disposed in a plane oblique to the plane of occlusion of the jaws, and a hinged joint having its axis disposed forward of said oblique plane and affording relative movement of said jaw model holders toward and from each other.

3. A dental articulator, comprising a lower jaw model holder, an upper jaw model holder pivoted to said lower jaw model holder on an axis disposed in a plane oblique to the plane of occlusion of said jaws, a hinged joint affording relative movement of said jaw model holders toward and from each other, and means adjustable to vary the longitudinal position of the jaw models.

4. A dental articulator, comprising a lower jaw model holder, an upper jaw model holder pivoted to said lower jaw model holder on an axis disposed in a plane oblique to the plane of occlusion of the jaws, a hinged joint having its axis disposed transverse to said oblique axis and forward thereof, means adjustable to vary the longitudinal position of the jaw models with respect to the axis of said hinged joint, and means adjustable to vary the distance between the axis of said hinged joint and the pivotal axis between the upper and lower jaw model holders.

5. A dental articulator, comprising a lower jaw model holder, an upper jaw model holder pivoted to said lower jaw model holder on an axis disposed in a plane oblique to the plane of occlusion of the jaws, a hinged joint in said upper jaw model holder affording relative movement of said jaw model holders toward and from each other, means adjustable to hold the upper jaw model independent of the lower jaw model, to permit its free movement therefrom, and means adjustable to vary the distance between the axis of said hinged joint and the oblique plane of the axis of the pivotal connection between said jaw model holders.

6. A dental articulator, comprising a lower jaw model holder, an upper jaw model holder, a pivotal connection between said jaw model holders, having its axis of oscillation in a plane oblique to the plane of occlusion of the jaws and affording a relative lateral movement of said jaws in transversely disposed arcs, means adjustable to secure said jaw model holders in any desired relative position in said arcs, a hinged joint in the upper model holder having its axis disposed transverse to the plane of the pivoted axis, and means adjustable to vary the relation between the axis of said hinged joint and the pivotal axis between said jaw model holders.

7. A dental articulator, comprising a base having a bearing whose axis extends in a plane oblique to said base, a lower jaw model holder having a frame adjustable with respect to said base, an upper jaw model holder support having a pintle disposed in the bearing in said base, an upper jaw model holder having a frame hingedly connected with said support and having means to adjust said frame with respect to the axis of said hinged connection, and means to adjust said support with respect to its pintle.

8. In a dental articulator, a base; a jaw model holder carried by the base; a pintle journaled to rotate at an angle to the base and in the plane of the medial line of the jaw holders; and an arm connecting the pintle and the movable jaw model holder.

9. In a dental articulator, a base; a jaw model holder carried by the base; a pintle journaled in a line at an angle to the base in the plane of the medial line of the jaw holder; an arm carried by the pintle; a hinge carried by the arm; and a complementary jaw model holder carried by the hinge.

10. In a dental articulator, the combination with a base, of a lower jaw model carried by said base, an upper jaw model carrier, a pintle disposed in a plane oblique to the plane of occlusion of the jaw models, and a hinged joint adjustable with respect to said pintle and the central incisive occluding point of the teeth of the jaws.

In testimony whereof I affix my signature in presence of two witnesses.

RUPERT E. HALL.

Witnesses:
JOHN L. FLETCHER,
L. L. MORRILL.

Copies of this patent may be obtained for five cents each, by addressing the "Commissioner of Patents. Washington, D. C."

holder having a frame adjustable with respect to said base, an upper jaw model holder support having a pintle disposed in the bearing in said base, an upper jaw model holder having a frame hingedly connected with said support and having means to adjust said frame with respect to the axis of said hinged connection, and means to adjust said support with respect to its pintle.

8. In a dental articulator, a base; a jaw model holder carried by the base; a pintle journaled to rotate at an angle to the base and in the plane of the medial line of the jaw holders; and an arm connecting the pintle and the movable jaw model holder.

9. In a dental articulator, a base; a jaw model holder carried by the base; a pintle journaled in a line at an angle to the base in the plane of the medial line of the jaw holder; an arm carried by the pintle; a hinge carried by the arm; and a complementary jaw model holder carried by the hinge.

10. In a dental articulator, the combination with a base, of a lower jaw model carried by said base, an upper jaw model carrier, a pintle disposed in a plane oblique to the plane of occlusion of the jaw models, and a hinged joint adjustable with respect to said pintle and the central incisive occluding point of the teeth of the jaws.

In testimony whereof I affix my signature in presence of two witnesses.

RUPERT E. HALL.

Witnesses:
JOHN L. FLETCHER,
L. L. MORRILL.

---

Corrections in Letters Patent No. 1,187,523.

It is hereby certified that in Letters Patent No. 1,187,523, granted June 20, 1916, upon the application of Rupert E. Hall, of Houston, Texas, for an improvement in "Dental Articulators," errors appear in the printed specification requiring correction as follows: Page 1, line 39, for the word "occupation" read *occlusion;* page 2, line 122, claim 6, before the word "model" insert the word *jaw;* and that the said Letters Patent should be read with these corrections therein that the same may conform to the record of the case in the Patent Office.

Signed and sealed this 15th day of August, A. D., 1916

[SEAL.]

F. W. H. CLAY,

*Acting Commissioner of Patents.*

Cl. 32—1.

It is hereby certified that in Letters Patent No. 1,187,523, granted June 20, 1916, upon the application of Rupert E. Hall, of Houston, Texas, for an improvement in "Dental Articulators," errors appear in the printed specification requiring correction as follows: Page 1, line 39, for the word "occupation" read *occlusion;* page 2, line 122, claim 6, before the word "model" insert the word *jaw;* and that the said Letters Patent should be read with these corrections therein that the same may conform to the record of the case in the Patent Office.

Signed and sealed this 15th day of August, A. D., 1916

[SEAL.]

F. W. H. CLAY,

*Acting Commissioner of Patents.*

Cl. 32—1.